Jan. 30, 1962 R. H. HOGE 3,018,794
VALVES AND SAFETY CONTROLS THEREFOR
Filed March 31, 1959 2 Sheets-Sheet 1

Fig. 1

INVENTOR.
ROBERT H. HOGE
BY
Charles O. Putnam
ATTORNEY

Jan. 30, 1962 R. H. HOGE 3,018,794
VALVES AND SAFETY CONTROLS THEREFOR
Filed March 31, 1959 2 Sheets-Sheet 2

INVENTOR.
ROBERT H. HOGE
BY
ATTORNEY

United States Patent Office 3,018,794
Patented Jan. 30, 1962

3,018,794
VALVES AND SAFETY CONTROLS THEREFOR
Robert H. Hoge, Gates Mills, Ohio, assignor to The Clark Controller Company, Cleveland, Ohio, a corporation of Ohio
Filed Mar. 31, 1959, Ser. No. 803,242
15 Claims. (Cl. 137—620)

My invention relates to valve apparatus of the general type which controls the admission of fluid under pressure to, and the exhausting of fluid under pressure from, a served apparatus when signaled to do so; and more specifically relates to valve apparatus which will infallibly exhaust the served apparatus when signaled to do so.

In the use of valve apparatus of this type, there are many applications where it is necessary for the safety of the operating personnel and the operating equipment, that the valve apparatus shall exhaust the served apparatus infallibly when signaled to do so. A failure to exhaust the served apparatus could result in the loss of life or limb and cause extensive and costly damage to the operating equipment.

One such application is with cyclically operating machines such as punch or forming presses. Here the valve apparatus is connected to serve an air operated clutch and brake. The press ram is connected through the clutch to a source of rotating power. When the valve apparatus is operated, air from a source of air under pressure releases the brake and engages the clutch. The engagement of the clutch connects the press ram to the source of power and it is driven through its operational cycle. When the valve apparatus is restored, it closes the source of air supply and allows the air under pressure in the clutch and brake to exhaust. The clutch then disconnects the press ram from the source of power, and the brake sets to stop further movement of the press.

The press operator controls the operation of the valve apparatus by push buttons or similar devices in an electrical circuit that connects to operating windings on the valve apparatus. The electrical circuits themselves have been improved for safety purposes as shown, for example, by United States Letters Patent 2,299,007. However, the safety built into such an electrical circuit is to protect against failures in the electrical circuit itself and does not protect against a malfunction of the valve apparatus.

The present invention comprises two valve units connected in series between a source of air pressure and the served apparatus; each having an intake port and an exhaust port. When the intake port of a valve unit is open, its exhaust port is closed and vice versa.

Normally, the intake port of the first valve unit is maintained open and air under pressure may flow through it to the second valve unit. The first valve unit may be operated to shut off the second valve unit and the served apparatus from the source of air pressure by closing its intake port. This opens its exhaust port, allowing any air pressure in the second valve unit and the served apparatus to be exhausted through it to atmosphere.

The second valve unit normally has its intake port closed to prevent air pressure from being communicated from the source to the served apparatus, and connects the served apparatus to exhaust at its open exhaust port. When the second valve unit is operated, its intake port opens connecting the first valve unit and the served apparatus, and its exhaust port closes, allowing air to flow to the served apparatus.

Throughout the normal operation of the valve apparatus, only the second valve unit is operated repeatedly to connect the source of air pressure to the served apparatus, and exhaust the air pressure therefrom. The first valve unit always remains in its said normal condition with its intake port open and its exhaust port closed, until such time that it receives a signal indicating that a failure has occurred. When such a signal is received, it will close its intake port between the source of air pressure and the second valve unit and open its exhaust port to exhaust the air pressure from the second valve unit and the served apparatus. It will then remain "locked out" in this condition until disconnected from the source of air pressure.

A feedback circuit is connected from a load chamber of the second valve unit to an operating chamber of the first valve unit and serves as a means for communicating air under pressure thereto. This air pressure serves as a signal, and, if a fault exists or occurs in any of the components of the second valve unit or in the feedback circuit itself, the signal air pressure will persist in the operating chamber of the first valve unit and make it operate. If no fault exists, the signal air pressure will not persist in the operating chamber of the first valve unit so that it will not operate and the signal air pressure will be exhausted therefrom.

A first pilot valve which is electromagnetically operated serves as the method of controllably operating the second valve unit.

A second pilot valve is connected in the feedback circuit to stop the flow of the signal air pressure therethrough. It is also electromagnetically operated and connected to operate concurrently with the electromagnet means of the first pilot valve to stop the flow of signal air pressure through the feedback circuit while the second valve unit is operated.

A pressure operated pilot valve is connected in the feedback circuit between the second pilot valve and the second valve unit to check or verify that the second pilot valve is operating properly. If it is not, the pressure operated pilot valve operates to signal the first valve unit that a failure has occurred. The first valve unit then closes its intake port between the source of air pressure and the second valve unit and open its exhaust port to exhaust the air pressure from the second valve unit and the served apparatus.

It is therefore the primary object of my invention to provide a valve apparatus which will infallibly exhaust a served apparatus when signaled to do so even though a component of the valve apparatus may have developed a fault, or may have failed to perform normally.

It is another object of my invention to provide a valve apparatus which will, upon failure of any of its components, prevent operation of the served apparatus until the failure has been corrected.

It is still another object of my invention to provide a valve apparatus which is stable in its operation even though the air pressure from the source may fluctuate widely.

A further object of my invention is to provide a valve apparatus which checks the operation of its components and which automatically becomes inoperative should any one component prove faulty.

A still further object of my invention is to provide a valve apparatus which is stable in its normal operation and which provides complete safety throughout its entire pressure operating range.

Still another object of my invention is to provide a valve apparatus with a reset feature that is easy to operate and which is capable of indicating whether or not the valve apparatus is safe for further operations.

The above and other objects of my invention will be made apparent to those skilled in the art when taken in consideration with the following specification and the accompanying drawings in which.

Figure 1:
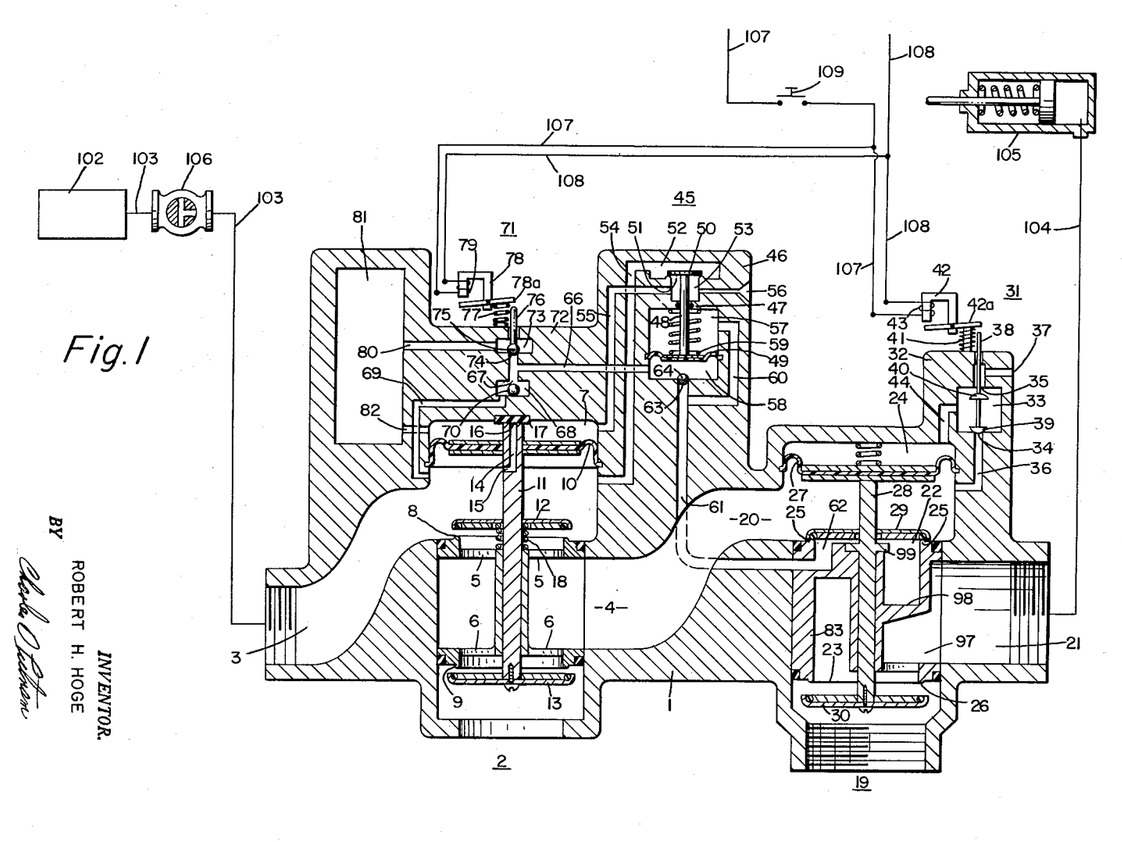
FIGURE 1 is a diagrammatic sectional view of a valve apparatus embodying my invention.

Referring to the drawings by reference numerals, there is generally shown at 1 a housing for the valve apparatus which is preferably made of a metal casting.

Two serially connected valve units are provided therein comprising chambers and passages in the casting, and the first valve unit which may be referred to as a safety unit is generally shown at 2. The safety unit 2 has an intake chamber 3, a load chamber 4, an intake port 5, an exhaust port 6, and an operating chamber 7. Intake chamber 3 and load chamber 4 are connected through intake port 5; and load chamber 4 and an exhaust to atmosphere are connected through exhaust port 6. A valve seat 8 is formed around intake port 5 and a second valve seat 9 is formed around exhaust port 6.

A diaphragm 10 is disposed between intake chamber 3 and operating chamber 7 and is caused to be moved reciprocally by an unbalance of forces acting upon it caused by air pressure in, or its absence from, either of the two chambers.

Connected to and extending through diaphragm 10 into operating chamber 7 is one end of a valve stem 11. The other end of valve stem 11 extends through a portion of intake chamber 3 and load chamber 4. It has a valve disc 12 intermediate its ends to cooperate with valve seat 8 for opening and closing intake port 5. A second valve disc 13 is located at the extreme lower end of valve stem 11 and cooperates with valve seat 9 for opening and closing exhaust port 6.

Upon reciprocation of diaphragm 10 and valve stem 11 in the up direction, valve disc 12 will move away from valve seat 8 to open intake port 5, and valve disc 13 will engage with valve seat 9 to close exhaust port 6. This connects intake chamber 3 to load chamber 4 and prevents load chamber 4 from exhausting to atmosphere through exhaust port 6. When diaphragm 10 and valve stem 11 are reciprocated in the down direction, valve disc 12 engages with valve seat 8 to close intake port 5 and valve disc 13 moves away from valve seat 9 to open exhaust port 6 so that load chamber 4 is shut off from intake chamber 3 and can be exhausted through exhaust port 6 to atmosphere.

Located in the upper portion of valve stem 11 and traversing along a part of its length, is a duct 14 that opens into intake chamber 3 at an opening 15 and opens into operating chamber 7 at an outlet 16.

Immediately above valve stem 11 in operating chamber 7 is a cushion 17, preferably made of rubber, on to which the end of valve stem 11 will seat when in its up position to close duct 14 at outlet 16.

A spring 18 is wound on valve stem 11 to normally bias it and diaphragm 10 toward their up position. The upward force of spring 18 is merely sufficient to overcome the weight of valve stem 11 and does not cause outlet 16 to be closed by cushion 17. Since valve stem 11 is not in its full up position, valve disc 13 will not engage completely with valve seat 9 and close valve port 6.

The second unit which may be referred to as the operating unit is shown generally at 19 and has an intake chamber 20, a load chamber 21, an intake port 22, an exhaust port 23, and an operating chamber 24. Intake chamber 20 and load chamber 21 are connected by intake port 22; and load chamber 21 and an exhaust to atmosphere are connected by exhaust port 23. A valve seat 25 is formed around intake port 22 and another valve seat 26 is formed around exhaust port 23.

A diaphragm 27 is disposed between intake chamber 20 and operating chamber 24 and is caused to be moved reciprocally by an unbalance of forces acting upon it caused by air pressure in, or its absence from, either of the two chambers.

Connected to diaphragm 27 is one end of a valve stem 28 which has a valve disc 29 intermediate its ends for cooperation with valve seat 25 to open and close intake port 22. Another valve disc 30 is located at its other end for cooperation with valve seat 26 to open and close exhaust port 23.

When diaphragm 27 and valve stem 28 are in their up position, valve disc 29 moves away from valve seat 25 to open intake port 22, and valve disc 30 engages with valve seat 26 to close exhaust port 23. This connects intake chamber 20 to load chamber 21 and prevents load chamber 21 from exhausting to atmosphere through port 23. When diaphragm 27 and valve stem 28 are in their down position, valve disc 29 will engage with valve seat 25 to close intake port 22, and valve disc 30 will have moved away from valve seat 26 to open exhaust port 23. This closes the connection between intake chamber 20 and load chamber 21 and connects load chamber 21 so it can be exhausted to atmosphere through exhaust port 23.

The means for controlling the operation of operating unit 19 by unbalancing the forces on the sides of diaphragm 27 is shown generally at 31 and is referred to as the operating pilot.

Operating pilot 31 consists of housing 32 having a chamber 33 therein. Chamber 33 has two valve ports 34 and 35. Valve port 34 is connected by duct 36 to intake chamber 20. Valve port 35 is connected to exhaust by duct 37.

A valve stem 38 extends into chamber 33 and has two valve discs 39 and 40 spaced along its length for respectively closing valve port 34 and opening valve port 35 when moved to its down position and for opening valve port 34 and closing valve port 35 when reciprocated to its up position. Valve stem 38 is normally in its down position as shown and is moved to its up position by air pressure in duct 36 acting on the bottom of valve disc 39. Once moved to its up position, valve stem 38 is firmly held there by the force of the air pressure acting on the under side of valve disc 40 to close port 35.

A duct 44 connects chamber 33 of the operating pilot 31 to operating chamber 24 of operating unit 19.

Any suitable means may be used to move and hold valve stem 38 in its down position such as the electromagnetic means shown at 42. Upon energization of winding 43, one end of armature 42A is attracted to magnet 42 and the other end is rotated downwardly, pushing valve stem 38 ahead of it against the force of the air pressure on valve disc 40. When winding 43 is de-energized, armature 42A moves back under the bias of a spring 41 allowing valve stem 38 to be moved back up by the force of air pressure.

As mentioned before, the safety unit 2 will be operated to close its intake port 5 and open its exhaust port 6 upon the occurrence of any fault to or failure of the components of the valve apparatus. This is done by communicating air pressure signals to chamber 7 of safety unit 2 by means of a feedback air circuit. The feedback air circuit comprises auxiliary devices which react to the signals air pressure and cause safety unit 2 to operate if a failure or fault has occurred.

One of these devices is generally shown at 45 and is commonly referred to as the vertifier. Verifer 45 comprises a housing 46 for confining a number of chambers and ducts therein. A valve stem 48 is located inside housing 46 and guided by shoulders 47. A diaphragm 49 is fastened at one end of stem 48, and a valve disc 50 at the other end.

Valve disc 50 cooperates with a valve port 51 to close communication between chambers 52 and 53 located respectively above and below valve disc 50 and valve port 51. Chamber 52 is connected by means of a duct 54 to intake chamber 3 of safety unit 2. Chamber 53 is connected by a duct 55 to operating chamber 7 of the safety unit 2 and to exhaust by a duct 56.

Diaphragm 49 is connected to housing 46 forming chambers 57 and 58 above and below it respectively. A spring 59 is wound around valve stem 48 between diaphragm 49 and shoulders 47 biasing diaphragm 49 to its down or normal position to aid in maintaining valve port 51 closed by valve disc 50. When air pressure in chamber 58 becomes sufficiently greater than that in chamber 57 to create an upward force sufficient to overcome the combined downward force of the air pressure in chamber 57, line air pressure on the top of valve disc 50, and the bias of spring 59, diaphragm 49 will move up pushing valve stem 48 ahead of it raising valve disc 50 to open valve port 51.

Chamber 57 is connected by means of a duct 60, a duct 61 and a pocket 62, to valve port 22 of the operating unit 19.

Chamber 58 is connected through a check valve port 63 and by duct 61 and pocket 62 to valve port 22 of the operating unit 19. A ball check 64 is located in chamber 58 and cooperates with check valve port 63 to prevent the flow of any air from chamber 58 to duct 61, but will allow substantially unrestricted flow of air from duct 61 to chamber 58.

Chamber 58 is also connected by a duct 66, a check valve port 67, a chamber 68, and a duct 69, to intake chamber 3 of the safety unit 2. A ball check 70 is located in chamber 68 for cooperation with check valve port 67 to prevent the flow of air from chamber 68 to duct 66, but will allow substantially unrestricted flow of air from duct 66 to chamber 68.

Another of the devices located in the feedback circuit is indicated generally at 71 and is referred to as the permissive pilot. Permissive pilot 71 consists of a housing 72, a chamber 73 therein, a check valve port 74, and a ball check 75. A reciprocable valve stem 76 cooperates with ball check 75 to close check valve port 74 when in the down position. Valve stem 76 is normally in its down position but it and ball check 75 can be pushed up to open check valve port 74 by the presence of air pressure in duct 66.

Any suitable means may be used to hold valve stem 76 in its down position. In the illustrated embodiment of my invention, an electromagnetic means 78 is used similar to the electromagnetic means 42. When operating winding 79 is energized, one end of the armature 78A is attracted to magnet 78 and the other end is rotated downwardly to hold valve stem 76 in its down position on top of ball check 75. When the operating winding 79 is de-energized, armature 78A is moved back by a spring 77 to free valve stem 76.

Chamber 73 is connected by check valve port 74 and duct 66 to chamber 58 of verifier 45. It is also connected by a duct 80, a stabilizing chamber 81 and a duct 82 to operating chamber 7 of the safety unit 2. When valve stem 76 is moved to its up position, air can flow from chamber 58 by duct 66, check valve port 74, chamber 73, duct 80, stabilizing chamber 81, and duct 82 to operating chamber 7 of the safety unit 2. Air cannot flow in the reverse direction because of ball check 75 closing check valve port 74. When valve stem 76 is held in its down position, air cannot pass check valve port 74 in either direction because of ball check 75 being firmly held on check valve port 74 by valve stem 76.

Pocket 62 which serves as the pressure source end of the feedback circuit is shown diagrammatically in FIGURE 1. For a more complete understanding of it and its principle of operation, the following reference is made of FIGURES 2 and 3. It is to be noted that the design of pocket 62 is essential to the proper operation of some of the safety features to be described later.

Figures 2, 4:
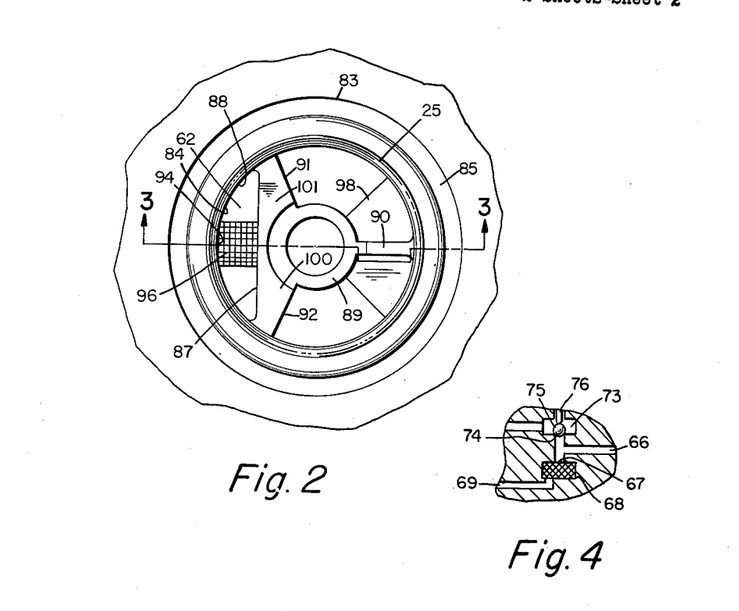
FIGURE 2 is the top view of a valve spool used in a valve unit of FIGURE 1.
FIGURE 4 is a diagrammatic representation of a plug inserted in port 67 and chamber 68.

Pocket 62 is formed in a valve spool 83 which is a part made separate from the general valve housing 1 for the convenience of manufacturing. Valve spool 83 is fitted into load chamber 21 and serves as a means of guiding valve stem 28 and the valve seats 25 and 26 are formed on it. It is generally cylindrical in shape, formed by wall 84 which has two flanges 85 and 86 extending outwardly from it. Flanges 85 and 86 support valve spool 83 in load chamber 21 of operating unit 19.

The inside wall 87 of pocket 62 is formed by a chord to circular wall 84 and the arc defined by the chord serves as the outside wall 88. The top of outside wall 88 is part of valve seat 25.

Valve stem 28 is guided by a tubular wall member 89 which is supported in the center of valve spool 83 by three radial spoke members 90, 91 and 92. Spoke members 91 and 92 are integral with inside wall 87 to form a unitary structure.

Figure 3:
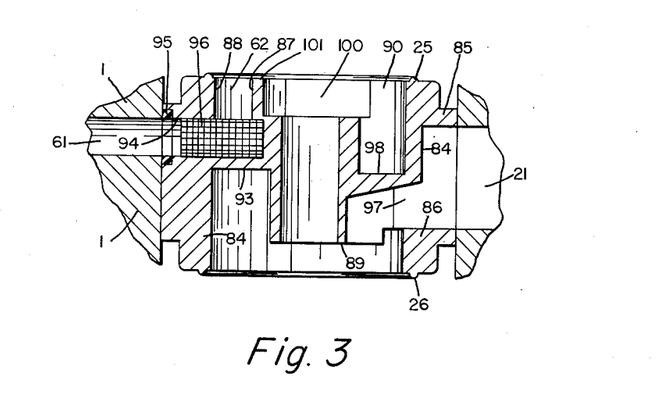
FIGURE 3 is a sectional view of the valve spool, taken in the direction of the arrows 3—3 in FIGURE 2.

As shown by FIGURE 3, pocket 62 has a bottom wall 93 and is connected by means of a hole 94 in wall 88 to the aforesaid feedback circuit duct 61. An O ring gasket 95 is placed between the housing 1 and valve spool 83 around hole 94 and duct 61, to seal the connection therebetween.

A screen 96 is placed in hole 94 to prevent the air flowing into the feedback circuit from carrying any foreign particles with it.

An opening 97 is located near the bottom of valve spool 83 on the side opposite to pocket 62 for connection between the inside of valve spool 83 and load chamber 21. A top to opening 97 is formed by a segment 98 between wall 84 and tubular member 89 and under radial spoke 90.

Valve stem 28 has an enlarged section 99, FIGURE 1, which fits into a counter bored recess 100 of wall 87 and spoke 90. The purpose of this enlarged section is to aid in the performance of one of the safety features which is described later. The top surface 101 of the unitary structure formed by wall 87 and spokes 91 and 92 is of such a height that a slot of a precise dimension (in this model approximately .020 of an inch) is formed between it and valve disc 29 when in its down position. The purpose of this slot will be described later.

*Normal operation*

As before described, one of the uses of the valve apparatus is to infallibly exhaust the pressure that operates the clutch and brake on a punch or forming press for the safety of the operator and the operating equipment. When connected to a press, intake chamber of safety unit 2 is connected to a source of air pressure 102 by suitable piping 103, and load chamber 21 of operating unit 19 is connected by suitable piping 104 to a served apparatus 105 in the form of a cylinder and piston, the piston being connected to the clutch and brake.

A manual 3-way valve 106 is normally connected in the piping 103 for manually disconnecting the valve apparatus from the source of air pressure 102 and exhausting the air pressure therein.

Windings 43 and 79 of electromagnetic means 42 and 78 respectively, are connected in parallel in an electrical press control circuit, which for simplicity of explanation, I have represented as a source of electrical power supplied by lines 107 and 108. A normally open push button 109 is connected in line 107 for controlling the energization and de-energization of windings 43 and 79.

When the operator desires to operate the press, he must first turn manual valve 106 to its "on" position so that air under pressure will be admitted to the valve apparatus.

The air under pressure will enter intake chamber 3 of safety unit 2 and apply pressure under diaphragm 10. Since only atmospheric pressure is present in operating chamber 7, diaphragm 10 will be positively pushed upward. This will move valve stem 11 upward and cause the top of it to firmly seat into rubber cushion 17, thereby closing duct 14 at opening 16 and preventing the flow of air through duct 14 into operating chamber 7. A small amount of air may flow through duct 14 into operating chamber 7 before opening 16 closes against cushion 17, but this air will have no effect since it will be exhausted through duct 55, chamber 53, and duct 56 to atmosphere.

With valve stem 11 in its up position, valve disc 12 is away from valve seat 8, opening valve port 5, so that intake chamber 3 is connected to load chamber 4 and air under pressure can flow into it. Exhaust port 6 is closed by valve disc 13 seating on valve seat 9 and prevents any exhausting of air through it.

The above action takes place even though air pressure exerts a downward force on the top of the valve disc 13. It is submitted here that the surface area presented by any of the valve discs to the air pressure is important in determining the value of air pressure required in the chamber above the diaphragm to cause it to move downward and be maintained there. That is, when valve stem 11 is in its up position the total upward force is due to the air pressure reacting against the bottom of diaphragm 10 and against the bottom of valve disc 12 plus the force of spring 18. The downward forces are due to the air pressure reacting against the tops of valve disc 12 and valve disc 13 plus the weight of stem 11 and valve discs 12 and 13. By adding the total upward and downward forces, it is seen that the resultant upward force is determined by the difference of the areas presented to air pressure by diaphragm 10 and valve disc 13. Therefore, the amount of air pressure required in chamber 7 above diaphragm 10 to move valve stem 11 down is determined by the area that the top of valve disc 13 presents to air pressure. By a similar analysis, it is seen that the air pressure required in chamber 7 above diaphragm 10 to maintain valve stem 11 in its down position is determined by the area that the top of valve disc 12 presents to air pressure.

Air from intake chamber 3 also flows into duct 69 and chamber 68, but can flow no further because ball check 70 will rise under pressure of the air and be firmly seated against check valve port 67.

Likewise, air from intake chamber 3 will flow through duct 54 into chamber 52, but will be stopped there since its pressure causes valve disc 50 to be firmly seated upon valve seat 51.

The air under pressure in load chamber 4 will flow into intake chamber 20 of operating unit 19. Here the air will exert an upward force against the under side of diaphragm 27 and downward force against the upper side of valve disc 29. These forces acting alone are unbalanced and tend to cause diaphragm 27 to move in the up direction. However, the air will also flow into duct 36, and push valve disc 39 away to open valve port 34 and close valve port 35. This allows air to flow through valve port 34, chamber 33, and duct 44 into operating chamber 24. This air in operating chamber 24 will exert a downward force on diaphragm 27 which balances the said upward force on the diaphragm tending to move it upwardly making the preponderance of forces in the down direction to maintain diaphragm 27 and valve discs 29 and 30 in their down position.

Load chamber 21 and served apparatus 105 are not subject to air pressure because of closed intake port 22 and are connected to exhaust through open exhaust port 23.

The valve apparatus is now in its ready condition and may be operated by depressing push button 109 to close its contacts and energize windings 43 and 79. When the windings are energized, armatures 42A and 78A are rotated. Armature 42A pushes valve stem 38 of operating pilot 31 down against the force of the air pressure on valve disc 40 to open valve port 35, and close valve port 34 by valve disc 39.

The movement of armature 78A holds valve stem 76 of permissive pilot 71 down against ball check 75 closing check valve port 74.

When valve port 34 becomes closed, the air pressure to operating chamber 24 by way of duct 44 is shut off, and the opening of valve port 35 allows air in operating chamber 24 to exhaust through duct 44, chamber 33, open valve port 35 and duct 37 to atmosphere.

The air pressure under diaphragm 27 will now overcome that acting down on valve disc 29 and cause diaphragm 27 to move up and carry valve stem 28 with it. This moves valve disc 29 away from valve seat 25 opening intake port 22 to the flow of air, and moves valve disc 30 into engagement with valve seat 26 closing exhaust port 23. Air now flows through open valve port 22 through valve spool 83, around and under segment 98, out at opening 97 to load chamber 21 and piping 104 to served apparatus 105 causing it to operate.

Some of the air when flowing into valve spool 83 will flow into pocket 62, duct 61, duct 60 and chamber 57. From duct 61, air will also push ball check 64 away from check valve port 63 and flow through it into chamber 58 and duct 66. Air cannot flow past check valve port 74 since it is closed by ball check 75 as before described.

Also, air will not flow past check valve port 67 since it is closed by ball check 70.

The valve means in verifier 45 will not operate because the total of the downward forces of the air pressure on the top of valve 50, and the bias of spring 59, and the air pressure in chamber 57 acting down on diaphragm 49, is greater than the upward force of the air pressure in chamber 58 acting upward on diaphragm 49.

When it is desired to exhaust served apparatus 105, push button 109 is released. This opens the electrical circuit to windings 43 and 79 to de-energize them. Armatures 42A and 78A are moved back to their normal positions by springs 41 and 77 respectively. Valve stem 38 is moved up by the air pressure in duct 36, closing valve port 35 by disc 40 and shutting off the exhaust to atmosphere from chamber 24, and opening valve port 34, thereby connecting operating chamber 24 to the air pressure in intake chamber 20 by way of ducts 36 and 44.

The force down on diaphragm 27 due to air pressure in operating chamber 24 plus that acting downward on valve disc 30, overcomes the force of air pressure in chamber 20 acting up on the bottom of diaphragm 27, so diaphragm 27 and valve stem 28 are moved to their down or normal positions.

In this position, with port 22 closed and port 23 open, air pressure to the served apparatus 105 is shut off and the air pressure in the served apparatus 105 is exhausted back through piping 104, load chamber 21, opening 97, valve spool 83 and open exhaust port 23 to atmosphere.

While the served apparatus 105 is exhausting as described, part of the feedback circuit is also exhausting through valve spool 83 and exhaust port 23 to atmosphere. This part consists of chamber 57, duct 60, duct 61 and pocket 62.

The portion of the feedback circuit comprising chamber 58 and duct 66 cannot exhaust by way of duct 61 because of ball check 64 closing check valve port 63. However, armature 78A at this time has moved back to its normal position, and valve stem 76 is released and ball check 75 is no longer held on check valve port 74. The air pressure in chamber 58 and duct 66 can move the ball check 75 and valve stem 76 away to open valve port 74; and will allow the air therein to exhaust through chamber 73, duct 80, stabilizing chamber 81, duct 82, operating chamber 7, duct 55, chamber 53 and duct 56 to atmosphere. While this air under pressure does flow through operating chamber 7, the downward force thereof on diaphragm 10 together with the downward force on valve disc 13 is insufficient to overcome the upward force of source pressure on chamber 3 acting on the under side of diaphragm 10 and cause diaphragm 10 to be moved down.

The reason that the downward force is insufficient, is that the air before flowing into operating chamber 7, must first flow through stabilizing chamber 81; and it is of such volumetric capacity, and ducts 80 and 82 are of such restricted sizes, that the accumulation of air pressure in operating chamber 7, is delayed. This delay allows some of the air going into operating chamber 7, to concurrently exhaust out of through duct 55, chamber 53 and duct 56 to atmosphere. Since the amount of air to be exhausted through operating chamber 7 during the normal operation is of a limited quantity, a stabilizing chamber such as 81, is able to keep the accumulation of air pressure in operating chamber 7 to a small value insufficient to operate the safety unit 2.

Thus, the additional advantage is obtained of being able to utilize a small value of pressure in chamber 7 at which the safety unit 2 will trip out when desired and yet not having unwanted tripping occurring during the normal exhausting of air pressure through chamber 7. This makes safety unit 2 very stable during normal operation of the valve apparatus and insures positive operation of the safety unit when signaled to do so by the occurrence of a failure, as now will be described.

Operation of safety features

As stated, a premise of the invention is to make a valve apparatus that will infallibly exhaust the served apparatus 105 irrespective of whether or not a component of the valve apparatus has developed a fault or has failed to operate properly. While failures of some components of the valve apparatus will not create an unsafe condition, it is still desirable in the case of such safe failures to have the valve apparatus indicate that it is not functioning properly. Failures in the valve apparatus are most likely to occur to those components that normally operate repeatedly, rather than to the components that operate only when a fault or a failure has occurred.

One of the safe failures is the failure of operating pilot 31 to move and hold valve stem 38 to the down position when signaled to do so by the depression of push button 109. This is a safe failure that is inherent in the operating unit 19. If valve stem 38 fails to move to its down position when signaled to do so, valve port 35 will not open to exhaust the air in operating chamber 24. Therefore, operating unit 19 will not operate and no air can flow to the served apparatus 105 to cause it to operate and thus there can be no unsafe condition due to failure of operating pilot 31 to operate initially.

Another safe failure is the failure of pilot 71 to hold valve stem 76 in its down position when signaled to do so by depression of push button 109. This failure will not create an unsafe condition, yet to indicate that a failure or a malfunction has occurred, the safety unit 2 should trip out and stop the operation of the served apparatus.

Since in this instance, no failure has occurred at operating pilot 31, it will function normally and cause diaphragm 27 to move up, opening intake port 22 to the flow of air. Air thus can flow through valve spool 83, opening 97, load chamber 21 and piping 104 to the served apparatus 105.

At the same time, air will flow into pocket 62 and then through hole 94, duct 61, check valve 63, chamber 58 to duct 66, where under normal operation it would be stopped by ball check 75 held firmly against check valve port 74 by valve stem 76.

However, due to the said failure or malfunction, this stopping of air flow has not occurred and the air will raise ball check 75 and valve stem 76 and flow through check valve port 74, into chamber 73, through duct 80, into stabilizing chamber 81 and by duct 82 into operating chamber 7 of safety unit 2. Even though the aforedescribed delay is incurred by the air flowing into operating chamber 7, and some of the air will be exhausted through duct 55, chamber 53 and duct 56, a sufficient quantity of air will be rapidly accumulated in chamber 7 to create a force in the down direction which, combined with the force of the air acting down on valve disc 13, overcomes the upward force on the diaphragm 10 and causes diaphragm 10 to move downward. This accumulation of air occurs since the air flowing through the feedback circuit is not of a limited amount as is the case during the normal operation of the apparatus. Here, the air in the feedback circuit is backed up by the air pressure in valve spool 83 to maintain the air in the feedback circuit under pressure as it flows into chamber 7.

As soon as valve stem 11 moves down far enough to free opening 16 of duct 14 from cushion 17, the supply of air to operating chamber 7 is supplemented by that flowing through duct 14 in stem 11. This causes the pressure to build up in operating chamber 7 even more rapidly to insure that diaphragm 10 and valves 12 and 13 are rapidly and positively forced to their down position.

When in this position, valve disc 12 engages with valve seat 8 to close valve port 5 and shut off the flow of air to operating unit 19 and served apparatus 105. At the same time, valve disc 13 moves away from valve seat 9 to open valve port 6 so that the air in operating unit 19 and served apparatus 105 exhaust through the port 6 and prevent further operation of the served apparatus 105.

When the exhaust has occurred, the feedback system can no longer supply air to operating chamber 7, because its supply will be shut off by valve 29 and exhausted along with the exhaust of the operating unit 19. Even after this has occurred however, the air pressure in operating chamber 7 will not decrease even though it is also connected to exhaust through duct 55, chamber 53 and duct 56, because the air flow through duct 14 to operating chamber 7 is more than sufficient to replace that which is being exhausted.

It is to be noted, that the downward force acting on top of valve disc 13 is transferred to the valve disc 12 when diaphragm 10 and valve stem 11 move to their down position and load chamber 4 is exhausted.

The force of the air pressure acting down on diaphragm 10 and valve disc 12 is greater than the force of the air pressure acting up on diaphragm 10, so it is positively held in the down position and maintains the safety unit 2 "locked out."

Before the valve apparatus can be reset to become operative again, the manual 3-way valve 106 must be turned off to exhaust the remaining air pressure in the valve apparatus, including that in operating chamber 7. After it is exhausted, diaphragm 10 and valve stem 11 will be returned to their up position by spring 18.

After the fault has been corrected, the valve apparatus may be reset by merely returning the manual 3-way valve 106 back to the on position and the safety unit 2 will operate as previously described. The valve apparatus will then be ready for normal operation.

It is therefore made compulsory to correct the fault before attempting to reset the valve apparatus by turning the 3-way manual valve 106 back to its on position, because if the fault is not corrected, the safety unit 2 will be tripped out again in the manner described. This is done to insure that the valve apparatus cannot be continuously operated after a failure has occurred to one of its components.

Another fault, which if it should occur will cause an unsafe condition of the served apparatus, is the failure of valve stem 38 of the operating pilot 31 to go to its up position when signaled to do so by the release of push button 109. This fault is protected by the safety unit 2 as follows. If it were not, the served apparatus 105 would be continuously operated giving the unsafe condition of keeping the press operated continuously.

When push button 109 is released, coil 79 of permissive pilot 71 is also de-energized allowing its armature 78A to move back and release valve stem 76 and ball check 75. The air in duct 66 will push ball check 75 away from check valve port 74 and flow through it, to chamber 73, duct 80, stabilizing chamber 81 and duct 82 to operating chamber 7. This air flow is maintained by the presence of air pressure in valve spool 83. The safety unit 2 will then trip out and remain "locked out" exhausting the served apparatus 105 and valve apparatus as previously described.

Another fault which may occur is the failure of the armature 78A of permissive pilot 71 to release valve stem 76 and ball check 75 when signaled to do so by the releasing of push button 109. This fault will not produce an unsafe condition because operating unit 19 does operate properly to exhaust the served apparatus 105, but since a component of the apparatus has failed, the operator should know of it. Again, this in accomplished by tripping and locking out safety unit 2 as follows.

When push button 109 is released, operating unit 19 will go to its down position to exhaust served apparatus 105. It also exhausts duct 61, duct 60 and chamber 57 in the feedback circuit. Since ball check 75 maintains check valve port 74 closed due to the fault, duct 66 and chamber 58 cannot be exhausted. With chamber 57 exhausted and chamber 58 having air pressure therein, a force is created in the up direction sufficient to overcome the downward bias of spring 59 and the downward force of line pressure on the top of valve disc 50.

Diaphragm 49 moves up and pushes valve stem 48 ahead of it, moving valve disc 50 away from valve port 51. Air then flows from intake chamber 3 through duct 54, chamber 52, open valve port 51, chamber 53 and duct 55 to operating chamber 7. Some of the air in chamber 53 is exhausted through duct 56 to atmosphere, but more than sufficient air will flow into operating chamber 7 to make diaphragm 10 move down. The safety unit 2 will then trip out and remain "locked out" in the aforedescribed manner.

Another feature of protection afforded by the valve apparatus is against the blocking or seriously restricting of the exhaust from the operating unit 19. To reduce the noise of exhaust in the area where the valve apparatus is used, mufflers are sometimes connected to the exhaust outlet of the operating unit 19, or the exhaust is piped to a remote area where the noise is not objectionable. If the muffler or the piping unduly restrict the exhausting of the served apparatus 105, it will create an unsafe condition and the safety unit 2 will trip and "lock out" as follows.

To create the unsafe condition, the restriction will prevent air from exhausing fast enough from the served apparatus 105 and operating unit 19, and will maintain pressure in them for a period of time after push button 109 has been released to signal exhaust.

It has been described previously how the safety unit 2 is caused to trip out when push button 109 is released, and air pressure is still maintained in the served apparatus 105 and valve spool 83 of operating unit 19. The same action takes place here; and when safety unit 2 is tripped out, the served apparatus 105 and operating unit 19 are exhausted rapidly through the unrestricted exhaust port 6 of the safety unit, thereby preventing the unsafe condition from continuing.

Another fault that could occur to give an unsafe operation of the press, but which is not associated with a failure of one of the valve apparatus components, is the lodging of a foreign particle under valve disc 29 to prevent it from closing completely against valve seat 25. If the particle is large enough, sufficient air will flow to served apparatus 105 to operate it when not desired.

When the particle props the valve disc 29 open, air will flow over valve seat 25 into valve spool 83. Since exhaust port 23 is also propped partially open, most of the air is exhausted and very little, if any, will be communicated to served apparatus 105.

At the same time, air will be flowing over the arc portion of the valve spool 83 that forms wall 88, into pocket 62. This air will attempt to flow out over the top surface 101 of wall 87 into valve spool 83. However, its flow is restricted by the small clearance between the surface 101 and the bottom of valve disc 29. In addition to this, the effective length over which air flows into pocket 62 is greater than the length over which it flows out of pocket 62, since the length of the circumference of an arc is greater than the length of the chord which forms it. Also, the effective length of the chord or wall 87 is further restricted by the fact that the enlarged portion 99 of valve stem 28 prevents any air from flowing over its center section.

These factors restricting the flow of air from pocket 62 makes the flow of air into pocket 62 greater than that flowing from it, so that a high pressure will be developed in pocket 62 by the accumulation of the air therein.

This air under pressure is communicated through duct 61, check valve port 63, chamber 58, duct 66, check valve port 74, chamber 73, duct 80, stabilizing chamber 81 and duct 82 to operating chamber 7 of safety unit 2. The presence of this air under pressure in operating chamber 7 will create enough downward force to move the diaphragm down to trip and "lock out" the safety unit 2 as before described and effect complete exhaust through exhaust port 9.

Sometimes a valve apparatus of this general type is connected to an air system that has insufficient supply capacity, or that has restrictions that causes the air pressure to drop abruptly to a low value when the air is supplied to the served apparatus and not recover to full line pressure until after an interval of time.

The served apparatus thus receives less than full line pressure and when as here contemplated it operates the clutch and brake of a press, the clutch and brake will not be operated positively which for well known reasons is objectionable. Such a drop of pressure, if sufficiently severe to be objectionable, will cause an unbalance of pressures in chambers 57 and 58 of verifier 45 so that, it will operate and trip out safety unit 2, as will be described. This operation of safety unit 2 will exhaust the insufficient pressure to give the indication that something is wrong so it can be corrected.

When the valve apparatus is first operated, air at line pressure is communicated to the feedback circuit, as before described, and to chambers 57 and 58. When the said drop of pressure takes place, it occurs only in chamber 57 since it is connected through pocket 62, duct 61 and duct 60. The drop in pressure cannot be reflected to chamber 58 in this manner because ball check 64 will keep check valve port 63 closed.

If this high pressure were allowed to persist in chamber 58, and if the drop of pressure in chamber 57 were great enough, the upward force on diaphragm 49 would be large enough to overcome the downward force of the pressure on diaphragm 49, the bias of spring 59, and the downward force of the line pressure on valve disc 50. It is to be noted that the drop in line pressure occurs also in chamber 52 which further reduces this downward force. Without any other circumstance, diaphragm 49 would then move to open valve port 51 and connect intake chamber 3 to chamber 7 by way of ducts 54 and 55 and cause safety unit 2 to trip out and exhaust the served apparatus.

There are some applications where such a trip and exhaust is desirable because the press clutch used is one that should be engaged rapidly and positively. If allowed to flutter or slip because of the drop of pressure, it would wear very rapidly and might even cause damage to the press itself. In these applications, the trip of safety unit 2 will indicate that the air supply is so restricted that the served apparatus operating the clutch is starved. That is, it does not receive a sufficient amount of air pressure to positively engage the clutch immediately. To accommodate such applications, a plug (see FIGURE 4) may be inserted into valve port 67 and chamber 68 to take the place of ball 70. The plug prevents the flow of air through check valve port 67 in either direction and the trip of safety unit 2 will then occur as just described.

In other applications, clutches are used that are not damaged by fluttering or slipping, or they may be of the soft start type. Here the build up of air pressure is intentionally made gradual to obtain the best operation of the clutch. In these instances, tripping of the safety valve unit 2 is not wanted when the drop of line pressure occurs.

This tripping is prevented by maintaining the pressure in chamber 58 and duct 66 at a value no greater than line pressure at all times. When the air pressure in intake chamber 3 drops, the air trapped in duct 66 and chamber 58 will be at a higher pressure. The lower pressure of intake chamber 3 is communicated to chamber 68 through duct 69. Now the pressure above ball check 70 in duct 66 is greater than that in chamber 68 and will push ball check 70 away from check valve port 67. Air will flow from duct 66 and chamber 58 through check valve port 67, chamber 68, and duct 69 to intake port 3 until the two pressures are equal. Thus, the pressure is balanced in chambers 57 and 58, on both sides of diaphragm 49, and it will not operate to give the aforedescribed trip of safety unit 2.

Although I have described my invention with a certain degree of particularity, it is to be understood that the above disclosure has been made only by way of example as required by law and that many changes in the details of construction and the combination and arrangement of parts may be resorted to without departing from the spirit and scope of my invention as hereinafter claimed.

Features of construction and operation illustrated and described herein, but not claimed, are being claimed in applications having Serial Number 490,080, now United States Patent 2,909,193, issued on October 20, 1959; Serial Number 570,050, now United States Patent 2,878,832, issued on March 24, 1959; and Serial 602,212, which was filed on August 6, 1956, now United States Patent 2,970,611, issued Feb. 7, 1961.

I claim as my invention:

1. A valve apparatus for controlling the supplying of fluid pressure from a fluid pressure source to an apparatus served thereby, and for exhausting the fluid pressure from the served apparatus; the valve apparatus comprising a first and second valve unit serially connected between the source of fluid pressure and the served apparatus; a first and second operating means for independently operating said first and second valve units respectively by pressure derived from the source; a feedback circuit connected to communicate fluid pressure between said second valve unit and said first operating means; a pilot valve connected in said feedback circuit normally maintaining it open and operable to close it; check valve means disposed in the feedback circuit between said pilot valve and second valve unit and arranged to permit the flow of fluid through it only in the direction toward said pilot valve; said first operating means normally maintaining said first valve unit continuously operated and connecting the source to said second valve unit and said first operating means to cause said first valve unit to disconnect the source and exhaust the served apparatus, said second operating means normally maintaining said second valve unit unoperated to exhaust the served apparatus and operable to cause said second valve unit to connect the served apparatus to the source, said pilot valve operable in unison with said second operating means, and means disposed in said feedback circuit between said pilot valve and first operating means to make the fluid flowing to said first operating means through said feedback circuit ineffective to cause said first valve unit to operate only when said second valve unit exhausts the served apparatus.

2. A valve apparatus for controlling the supplying of fluid pressure from a fluid pressure source to an apparatus served thereby, and for exhausting the fluid pressure from the served apparatus; the valve apparatus comprising a first and second valve unit serially connected between the source of fluid pressure and the served apparatus; a first and second operating means for independently operating said first and second valve units respectively by pressure derived from the source; a feedback circuit connected to communicate fluid pressure between said second valve unit and said first operating means; a pilot valve connected in said feedback circuit normally maintaining it open and operable to close it; check valve means disposed in said feedback circuit between said pilot valve and second valve unit; circuit means connected from the first valve unit to said feedback circuit between said pilot valve and check valve; said first operating means normally maintaining said first valve unit continuously operated and connecting the source to said second valve unit and said first operating means operable to cause said first valve unit to disconnect the source and exhaust the served apparatus, said second operating means normally maintaining said second valve unit unoperated to exhaust the served apparatus and operable to cause said second valve unit to connect the served apparatus to the source, said pilot valve operable in unison with said second operating means, said check valve means arranged to permit the flow of fluid only in the direction toward said pilot valve, and said circuit means arranged to permit the flow of fluid only from said feedback circuit toward said first valve unit, and upon a drop of fluid pressure in said first valve unit fluid flows in said circuit means from said feedback circuit to said first valve unit maintaining the fluid pressure in said feedback circuit no greater than that in said first valve unit.

3. A valve apparatus for controlling the supplying of fluid pressure from a fluid pressure source to an apparatus served thereby, and for exhausting the pressure from the served apparatus; the valve apparatus comprising a first and second valve unit serially connected between the source and the served apparatus; a first operating means for operating said first valve unit and normally maintaining it operated connecting the source to said second valve unit and said first valve unit operable to disconnect the source and exhaust the served apparatus; a second operating means for operating said second valve unit and normally maintaining it unoperated to exhaust the served apparatus and operable to connect the source to the served apparatus; said first and second operating means independently operable by pressure derived from the source; a feedback circuit connected to communicate fluid pressure between said second valve unit and said first operating means; a check valve, a pressure operated valve, a pilot valve, and retarding means, all connected in said feedback circuit and disposed respectively between said second valve unit and said first operating means; said check valve for permitting the flow of fluid from said second valve unit into said feedback circuit, said pressure operated valve operable by fluid pressure in said feedback circuit to connect the source to said first operating means, said pilot valve operable to prevent the flow of fluid through said feedback circuit to said first operating means and operable in unison with said second operating means, said retarding means rendering the pressure in the feedback circuit ineffective to operate said first operating means when said second valve unit exhausts the served apparatus, and upon failure of said second valve unit to exhaust the served apparatus, said first operating means being operated by fluid pressure flowing through said feedback circuit causing said first valve unit to exhaust the served apparatus.

4. A valve apparatus for controlling the supplying of fluid pressure from a pressure source to an apparatus served thereby, and for exhausting the fluid pressure from the served apparatus; the valve apparatus comprising a first and second valve unit serially connected between the source of fluid pressure and the served apparatus; a first and second operating means for independently operating said first and second valve units respectively by pressure derived from the source; a feedback circuit connected to communicate fluid pressure between said second valve unit and said first operating means; a pilot valve connected in said feedback circuit normally maintaining it open and operable to close it; check valve means disposed in the feedback circuit between said pilot valve and said second valve unit and arranged to permit the flow of fluid through it only in the direction toward said pilot valve; a pressure operated valve connected in said feedback circuit between said pilot valve and said check valve and operable by a fluid pressure in the feedback circuit to connect the source to said first operating means; said first operating means normally maintaining said first valve unit continuously operated and connecting the source to said second valve unit and operable to disconnect the source and cause said valve unit to exhaust the served apparatus, said second operating means normally maintaining said second valve unit unoperated to exhaust the served apparatus and operable to cause said second valve unit to connect the served apparatus to the source, said pilot valve operable in unison with said second operating means, and retarding means disposed in said feedback circuit between said pilot valve and first operating means to make the fluid flowing to said first operating means through said feedback circuit ineffective to cause said first operating means to operate said first valve unit only when said second valve unit exhausts the served apparatus.

5. A valve apparatus for controlling the supplying of fluid pressure from a pressure source to an apparatus served thereby, and for exhausting the pressure from the served apparatus; the valve apparatus comprising a first and second valve unit serially connected between the source and the served apparatus; a first and second operating means for independently operating said first and second valve units respectively by pressure derived from the source; a feedback circuit connected to communicate fluid pressure between said second valve unit and said first operating means; a first pilot valve connected in said feedback circuit normally maintaining it open and operable to close it, a check valve disposed in said feedback circuit between said second valve unit and said first pilot valve and arranged to permit the flow of fluid through it toward said first pilot valve from said second valve unit; a pressure operated valve having a first and second chamber and operable by the preponderance of pressure in said first chamber to connect the source to said first operating means, said first chamber connected in said feedback circuit between said check valve and said first pilot valve, said second chamber connected to said feedback circuit between said second valve unit and said check valve; said first operating means normally maintaining said first valve unit continuously operated and connecting the source to said second valve unit and said first operating means operable to disconnect the source and cause said first valve unit to exhaust the served apparatus; said second operating means normally maintaining said second valve unit unoperated to exhaust the served apparatus and operable to cause said second valve to connect the source to the served apparatus; a second pilot valve for operating said second operating means; said first and second pilot valves operable in unison, and retarding means disposed in said feedback circuit between said first pilot valve and said first operating means to make the fluid flowing through said feedback circuit ineffective to cause said first operating means to operate said first valve unit only when said second valve unit exhausts the served apparatus.

6. A valve apparatus as described in claim 5 wherein the check valve is located in said first chamber.

7. A valve apparatus as described in claim 5 having a second check valve connected between said feedback circuit and the first valve unit and arranged to permit the flow of fluid only in the direction toward the first valve unit.

8. A valve apparatus as described in claim 7 wherein the second check valve is connected to the feedback circuit between said first pilot valve and said check valve.

9. A valve apparatus for controlling the supplying of fluid pressure from a pressure source to an appratus served thereby, and for exhausting the pressure from the served apparatus; the valve apparatus comprising a first and second valve unit serially connected between the source and the served apparatus; a first and second operating means for independently operating said first and second valve units respectively by pressure derived from the source; a feedback circuit connected to communicate fluid pressure between said second valve unit and said first operating means; a first pilot valve connected in said feedback circuit normally maintaining it open and operable to close it, a first check valve disposed in the feedback circuit between said second valve unit and said first pilot valve and arranged to permit the flow of fluid through it toward said first pilot valve from said second valve unit; a pressure operated valve having a first and second chamber and operable by the preponderance of pressure in said first chamber to connect the source to said first operating means, said first chamber connected in said feedback circuit between said first check valve and said first pilot valve, said second chamber connected to said feedback circuit between said second valve unit and said first check valve; said first operating means normally maintaining said first valve unit continuously operated and connecting the source to said second valve unit and said first operating means operable to disconnect the source and cause said first valve unit to exhaust the served apparatus; said second operating means normally maintaining said second valve unit unoperated to exhaust the served apparatus and operable to cause said second valve unit to connect the source to the served apparatus; a second pilot valve for operating said second operating means; said first and second pilot valves operable in unison, and a second check valve connected between said first valve unit and feedback circuit and arranged to prevent the fluid pressure in said feedback circuit from being maintained at a value greater than that in the first valve unit.

10. A valve apparatus as described in claim 9 wherein the second check valve is connected to the feedback circuit between said first pilot valve and said first check valve.

11. A valve apparatus for controlling the supplying of fluid pressure from a pressure source to an apparatus served thereby, and for exhausting the fluid pressure from the served apparatus; the valve apparatus comprising a first and second valve unit serially connected between the source of fluid pressure and the served apparatus; a first and second operating means for independently operating said first and second valve units respectively by pressure derived from the source; a feedback circuit connected to communicate fluid pressure between said second valve unit and said first operating means; a pilot valve connected in said feedback circuit normally maintaining it open and operable to close it; a check valve means disposed in said feedback circuit between said pilot valve and said second valve unit; circuit means connected from the first valve unit to said feedback circuit; said first operating means normally maintaining said first valve unit continuously operated and connecting the source to said second valve unit and said first operating means operable to cause said first valve unit to disconnect the source and exhaust the served apparatus, said second operating means normally maintaining said second valve unit unoperated to exhaust the served apparatus and operable to cause said second valve unit to connect the served apparatus to the source, said pilot valve operable in unison with said second operating means, said check valve means arranged to permit the flow of fluid only in the direction toward said pilot valve, and said circuit means arranged to permit the flow of fluid only from said feedback circuit toward said first valve unit, and upon a drop of fluid pressure in said first valve unit fluid flows from said feedback circuit to said first valve unit maintaining the fluid pressure in said feedback circuit no greater than that in said first valve unit.

12. A valve apparatus for controlling the supplying of fluid pressure from a fluid pressure source to an apparatus served thereby, and for exhausting the fluid pressure from the served apparatus; the valve apparatus comprising a first and second valve unit serially connected between the source of fluid pressure and the served apparatus; a first and second operating means for independently operating said first and second valve units respectively by pressure derived from the source; a feedback circuit having a flow retarding means therein connected to communicate fluid pressure from said second valve unit through the flow retarding means to said first operating means; said first operating means normally maintaining said first valve unit continuously operated and connecting said source to said second valve unit and said first operating means operable to cause said first valve unit to disconnect the source and exhaust the served apparatus, said second operating means normally maintaining said second valve unit unoperated to exhaust the served apparatus and operable to cause said second valve unit to connect the served apparatus to the source; upon return of said second operating means to its normal condition and failure of said second valve unit to exhaust the served apparatus, fluid pressure flows through said feedback circuit and the flow retarding means to said first operating means causing it to operate said first valve unit to exhaust the served apparatus.

13. A valve apparatus for controlling the supplying of fluid pressure from a fluid pressure source to an apparatus served thereby, and for exhausting the fluid pressure from the served apparatus; the valve apparatus comprising a first and second valve unit serially connected between the source of fluid pressure and the served apparatus; a first and second operating means for independently operating said first and second valve units respectively by pressure derived from the source; a feedback circuit connected to communicate fluid pressure between said second valve unit and said first operating means; a pilot valve connected in said feedback circuit and normally maintaining it open and operable to close it; a flow retarding means connected in said feedback circuit; said first operating means normally maintaining said first valve unit continuously operated and connecting said source to said second valve unit and said first operating means operable to cause said first valve unit to disconnect the source and exhaust the served apparatus, said second operating means normally maintaining said second valve unit unoperated to exhaust the served apparatus and operable to cause said second valve unit to connect the served apparatus to the source, said pilot valve operable in unison with said second operating means, and upon failure of said second operating means to return to its normal condition said pilot valve opens said feedback circuit so fluid flows through the flow retarding means to said first operating means causing said first valve unit to exhaust the served apparatus.

14. A valve apparatus for controlling the supplying of fluid pressure from a fluid pressure source to an apparatus served thereby, and for exhausting the fluid pressure from the served apparatus; the valve apparatus comprising a first and second valve unit serially connected between the source of fluid pressure and the served apparatus; a first and second operating means for independently operating said first and second valve units respectively by pressure derived from the source; a feedback circuit connected to communicate fluid pressure between said second valve unit and said first operating means; a pilot valve connected in said feedback circuit and normally maintaining it open and operable to close it; a flow retarding means connected in said feedback circuit; said first operating means normally maintaining said first valve unit continuously operated and connecting said source to said second valve unit and said first operating means operable to cause said first valve unit to disconnect the source and exhaust the served apparatus, said second operating means normally maintaining said second valve unit unoperated to exhaust the served apparatus and operable to cause said second valve unit to connect the served apparatus to the source, said pilot valve operable in unison with said second operating means, and upon failure of said pilot valve to operate said feedback circuit remains open so fluid flows through the flow retarding means to said first operating means causing said first valve unit to exhaust the served apparatus.

15. A valve apparatus for controlling the supplying of fluid pressure from a pressure source to an apparatus served thereby, and for exhausting fluid pressure from the served apparatus; a valve apparatus comprising a first and second valve unit serially connected between the source and the served apparatus; a first and second operating means for independently operating said first and second valve units respectively by pressure derived from the source; a feedback circuit connected to communicate fluid pressure between said second valve unit and said first operating means; a flow retarding means connected in said feedback circuit; a pocket in said second valve unit connected to said feedback circuit and arranged to receive fluid when it flows into said second valve unit; said first operating means normally maintaining said first valve unit continuously operated and connecting said source to said second valve unit and said first operating means operable to cause said first valve unit to disconnect the source and exhaust the served apparatus, said second operating means normally maintaining said second valve unoperated to exhaust the served apparatus and operable to cause said second valve unit to connect the served apparatus to the source; said pocket effective to substantially restrict the flow of fluid from said pocket when said second valve unit is substantially inoperative and ineffective to restrict the flow of fluid from said pocket when said second valve unit is operated, and upon failure of said second valve unit to completely disconnect the served apparatus from the source, pressure will accumulate in said pocket and flow to said first operating means through said feedback circuit and the flow retarding means causing said first valve unit to exhaust said second valve unit and the served apparatus.

No references cited.